United States Patent

Ho et al.

[11] Patent Number: 6,137,848
[45] Date of Patent: Oct. 24, 2000

[54] METHOD AND SYSTEM FOR JOINT TIMING RECOVERY AND CHANNEL ESTIMATION FOR DMT MODEMS

[75] Inventors: Jin-Meng Ho, Lake Hiawatha; Edward L. Wallace, South Orange, both of N.J.

[73] Assignee: AT&T Corp., New York, N.Y.

[21] Appl. No.: 08/963,353

[22] Filed: Nov. 3, 1997

[51] Int. Cl.[7] ................................................ H04L 7/00
[52] U.S. Cl. .......................... 375/354; 375/222; 375/377
[58] Field of Search .................................. 375/354, 222, 375/231, 355, 364, 365, 377

[56] References Cited

U.S. PATENT DOCUMENTS

| | | | |
|---|---|---|---|
| 5,790,514 | 8/1998 | Marchok et al. | 370/208 |
| 6,005,893 | 12/1999 | Hyll | 375/260 |
| 6,021,167 | 2/2000 | Wu | 375/354 |
| 6,038,251 | 3/2000 | Chen | 375/222 |

OTHER PUBLICATIONS

U.S. Patent No. 5,625,651, filed on 6/2/94 and issued on 4/29/97 to Cioffi.
U.S. Patent No. 5,319,679, filed on 12/9/92 and issued on 6/7/94 to Bagby.
U.S. Patent No. 5,570,370, filed on 4/28/95 and issued on 10/29/96 to Lin.
U.S. Patent No. 4,416,015, filed on 12/30/81 and issued on 11/15/83 to Gitlin.
U.S. Patent No. 4,285,061, filed on 9/14/79 and issued on 8/18/81 to Ho.

Primary Examiner—Stephen Chin
Assistant Examiner—Mohammad Ghayour
Attorney, Agent, or Firm—Banner & Witcoff, Ltd.

[57] ABSTRACT

A method and a system for acquiring data frame timing in a discrete multitone modem system in which an acquisition frame is generated having a first predetermined number of impulse signals. Each impulse signal is spaced in time by $2(P+1)T_s$, such that $1/T_s$ is a sample transmission rate, and P is a time length in samples of a cyclic prefix that is added to a data frame. The cyclic prefix length P is chosen such that a channel impulse response seen at a receiver effectively spans no more than P+1 samples when a received signal is sampled at the $1/T_s$ rate. Data frames are generated subsequent to the acquisition frame. Each data frame includes a cyclic prefix and at least as many data samples as samples of the cyclic prefix. The acquisition and data frames are converted to an analog signal for transmission. The received acquisition frame is sampled and a summation window is advanced one sample at a time through the received acquisition frame. The sampled acquisition frame is summed over each summation window, with each summation window spanning P+1 samples of the acquisition frame. A maximum summation value is determined as the summation window advances, and a data frame boundary is determined based on the summation window corresponding to the maximum summation value. A channel impulse response is estimated based on the P+1 samples of the received acquisition frame corresponding to the maximum summation value, and data is coherently detected based on the estimated channel impulse response.

84 Claims, 2 Drawing Sheets

METHOD AND SYSTEM FOR JOINT TIMING RECOVERY AND CHANNEL ESTIMATION FOR DMT MODEMS

BACKGROUND OF THE INVENTION

1. Field of the Invention

The present invention relates to the field of telecommunications. More particularly, the present invention relates to a method and a system for acquiring and tracking frame boundaries of a received Discrete Multitone (DMT) signal in a DMT system.

2. Description of the Related Art

In conventional Discrete Multitone (DMT) modems, long pseudo-random (PN) sequences and correlation computations are used for timing acquisition and for tracking. The long sequences used result in a high implementation complexity, as well as an increased overhead and signal processing delay associated with both call setup and data transmission. The PN sequences are first encoded into discrete tones, and then are transformed using an inverse discrete Fourier transform into time-domain samples for transmission. The received samples are Fourier transformed to reproduce the PN sequence, and then are correlation tested for identifying frame boundaries. Channel estimation, which is used for coherent signal detection, is done only during call setup and requires separate PN sequences. Consequently, subsequent signal detection is susceptible to clock drift.

What is needed is an efficient and effective technique that can be used with DMT modems for joint timing recovery and channel estimation.

SUMMARY OF THE INVENTION

The present invention provides an efficient and effective technique that can be used with DMT modems for joint timing recovery and channel estimation. Clock recovery for DMT modems is simplified by utilizing channel dispersion properties and, as a result, reduces overhead and time delay at call set up and during data transmission, while minimizing effects of mistiming. For example, in an HDSL (High-rate Digital Subscriber Line) environment, where highly dispersive twisted copper wires are used for high-speed data transmission, the present invention significantly reduces the overhead and computation complexity and, consequently, the time required for establishing and tracking DMT frame boundaries. Additionally, channel estimation is done jointly, thus rendering signal detection less sensitive to sampling timing. The invention is also applicable to radio transmissions, where carrier modulation is used for shifting the transmission signal to the desired frequency ranges.

The advantages of the present invention are provided by a method and a system for acquiring data frame timing in a discrete multitone modem system in which an acquisition frame is generated having a first predetermined number of impulse signals. According to the invention, the spacing of the impulse signals in time is $2(P+1)T_s$, such that $1/T_s$ is a sample transmission rate, and P is a time length in samples of a cyclic prefix that is added to a data frame. Preferably, the cyclic prefix length P is chosen such that a channel impulse response seen at a receiver effectively spans no more than P+1 samples when a signal received at the receiver is sampled at the $1/T_s$ rate. Data frames are generated subsequent to the acquisition frame, e.g., from an inverse discrete Fourier transform on a set of discrete tones that contain information data. Each data frame includes (after the inverse discrete Fourier transform) a cyclic prefix and at least as many data samples as samples of the cyclic prefix. The acquisition frame and the data frame are then converted from a digital signal to an analog signal for transmission. The receiver samples the received acquisition frame and advances a summation window one sample at a time through the received acquisition frame. The sampled acquisition frame is summed over each summation window, with each summation window spanning P+1 samples of the acquisition frame. A maximum summation value is determined as the summation window advances and a data frame boundary is determined based on the summation window corresponding to the maximum summation value. A channel impulse response is estimated based on the P+1 samples of the received acquisition frame corresponding to the maximum summation value, and data is coherently detected based on the estimated channel impulse response.

A synchronization frame is generated after every predetermined number of data frames having a second predetermined number of impulse signals. Accordingly, each impulse signal of the synchronization frame is spaced in time from each other by $2(P+1)T_s$. A first impulse signal of each synchronization frame is spaced in time by $2(P+1)T_s$ from a last data sample in a data frame that is immediately preceding the synchronization frame, and a last impulse signal of each synchronization frame is spaced in time by $2(P+1)T_s$ from a first prefix sample of a data frame that is immediately subsequent to the synchronization frame. The synchronization frame is sampled at the receiver, and a summation window is advanced through the received synchronization frame, again, one sample at a time. The sampled synchronization frame is summed over each summation window, with each summation window spanning P+1 samples of the synchronization frame. A maximum summation value is determined as the summation window advances and the data frame boundary is updated based on the summation window corresponding to the maximum summation value. The estimated channel impulse response is also updated based on the P+1 samples of the received synchronization frame corresponding to the maximum summation value, and the data is coherently detected based on the updated estimated channel impulse response.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a low-overhead and low-complexity technique for optimally acquiring and tracking frame (i.e., symbol) boundaries of a received Discrete Multitone (DMT) signal in a DMT system. Additionally, the technique of the present invention produces an estimate of the channel impulse response, which is required for coherent signal detection. As a result, any adverse impact on timing acquisition and tracking caused by clock drift is minimized.

The present invention uses a predetermined number of digital impulses appropriately spaced in time, that is, discrete delta signals, that are transmitted during a call set up. The effects of channel dispersion on the impulse response of the transmitted signal at the receiver is determined by advancing a summation window over a possible time span of the received spread impulse and by determining the summation window that provides a maximum sum of squared samples within the summation window as compared to the sums obtained from other summation windows. Joint timing acquisition and channel estimation are achieved by the maximum-sum summation window identifying the data frame boundary and by the received impulse samples within the same summation window approximating the channel impulse response. The technique provided by the present invention is optimal in that a symbol boundary is chosen such that an average signal-to-noise ratio is maximized.

According to the invention, timing tracking is done in a similar manner. A short synchronization frame containing a predetermined number of digital impulses appropriately spaced in time is inserted into a superframe formed from several data frames that are each longer than the synchronization frame. Timing tracking is then provided by identifying the maximum sum as a summation window advances within boundaries of the synchronization frame. Accordingly, channel estimation is simultaneously provided and is used for coherently detecting the subsequent data frames occurring within the next superframe.

Figure 1:
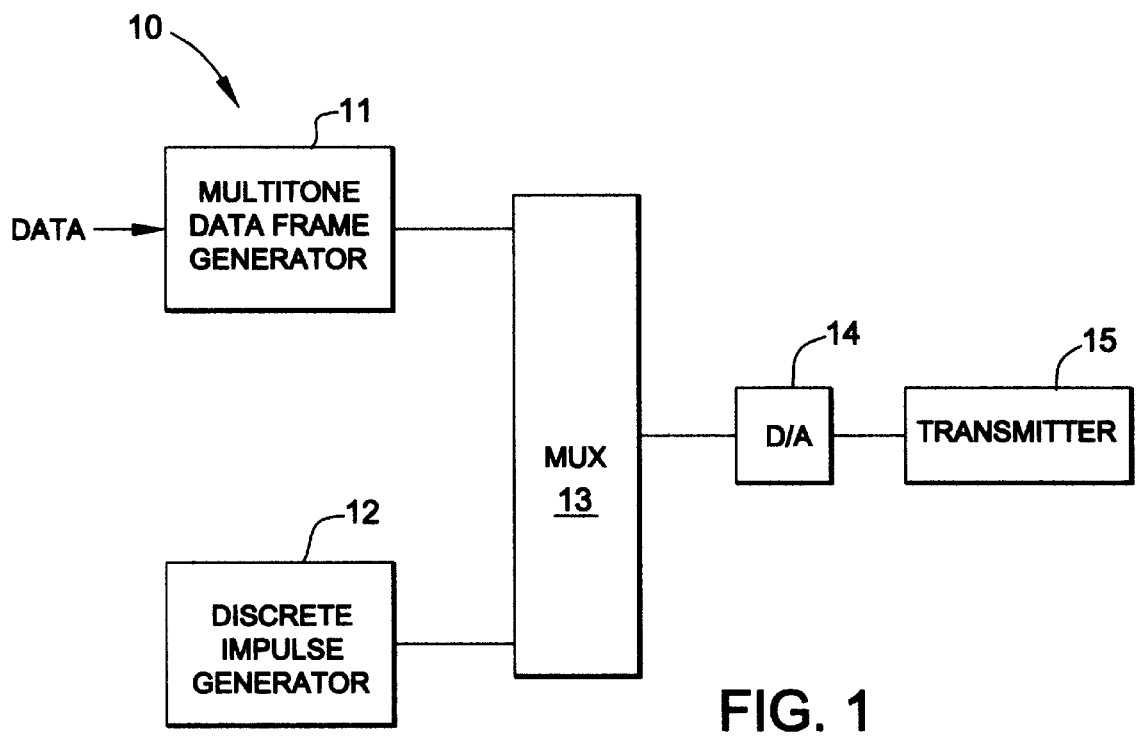
FIG. 1 shows a schematic block diagram of a circuit for generating a signal for timing acquisition and tracking according to the present invention.

FIG. 1 shows a schematic block diagram of a circuit 10 for generating a signal for timing acquisition and tracking according to the present invention. Circuit 10 includes a multitone data frame generator 11 and a discrete impulse generator 12 that are coupled to respective inputs to a multiplexor 13. Multiplexor 13 is controlled in a well-known manner to selectively output a multitone signal generated by multitone data frame generator 11 or a discrete impulse signal output by discrete impulse generator 12. The output of multiplexor 13 is applied to the input of a digital-to-analog (D/A) converter 14. The output of D/A converter 14 is applied to a transmitter 15 for transmission. Transmitter 15 converts the output from D/A converter 14 in a well-known manner to a signal having characteristics and parameters that are appropriate for the environment in which circuit 10 is used.

Figure 2:
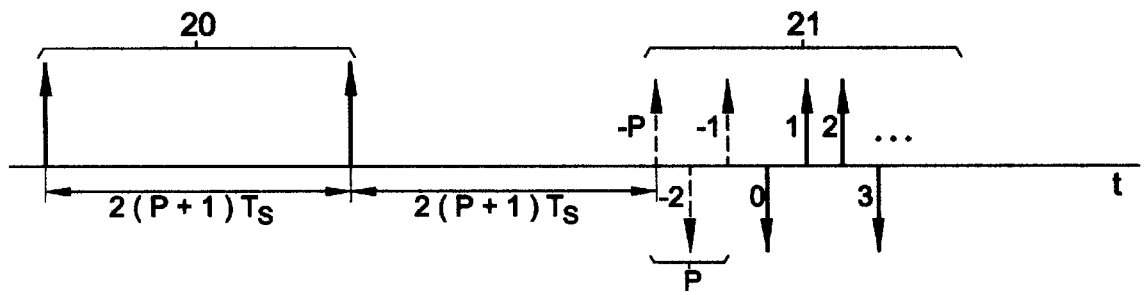
FIG. 2 shows a timing diagram for a transmitted signal used for timing acquisition and tracking according to the present invention.

FIG. 2 shows a timing diagram for a transmitted signal used for timing acquisition and tracking according to the present invention. Prior to data transmission, a predetermined number of discrete impulses I spaced in time at twice the effective length of the channel impulse response are transmitted to a receiver within a timing acquisition frame 20. That is, each impulse I is spaced in time by $2(P+1)T_s$, where $1/T_s$ is the sample transmission rate, and P is the time length in samples of a cyclic prefix that is added to a data frame or symbol. The cyclic prefix length P is chosen such that the channel impulse response seen at the receiver effectively spans no more than P+1 samples, if the received signal is also sampled at the rate $1/T_s$. A data frame 21, having a plurality of data samples and augmented by a cyclic prefix, follows the timing acquisition frame.

Figure 3:
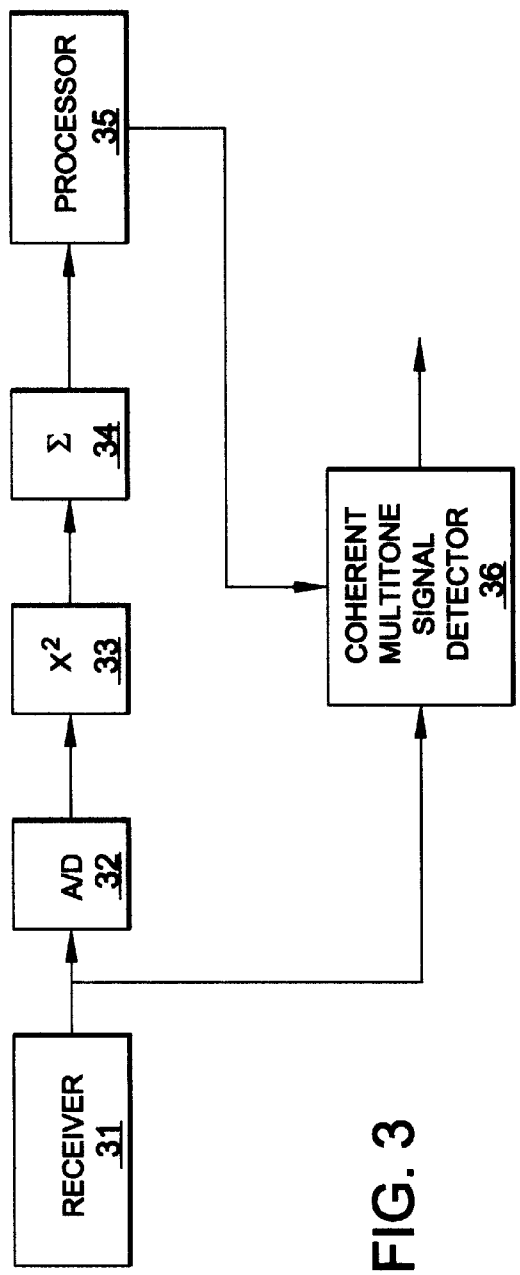
FIG. 3 shows a schematic block diagram of a circuit for acquiring and tracking frame boundaries according to the present invention.

FIG. 3 shows a schematic block diagram of a circuit 30 for acquiring and tracking frame boundaries according to the present invention. Circuit 30 includes a receiver 31 that receives a transmitted signal. The output of receiver 31 is applied to the input of an analog-to-digital (A/D) converter 32. A/D converter 32 samples the received signal at the rate of $1/T_s$. The sampled outputs from A/D converter 32 are squared by squaring circuit 33 and then summed by summing circuit 34 using an advancing summation window that spans P+1 samples. The summation window that yields a maximum sum is determined in a well-known manner by processor 35. Processor 35 uses the maximum-sum summation window for determining a data frame boundary and for estimating a channel impulse response. The estimated channel impulse response is then output to coherent multitone signal detector 36 for coherently detecting data using the estimated channel impulse response.

Figure 4:
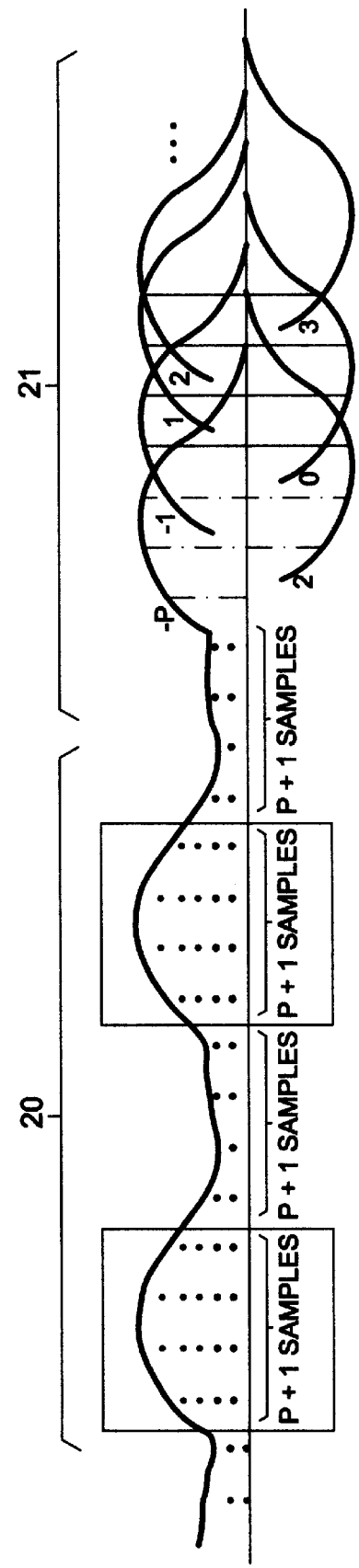
FIG. 4 shows a timing diagram for a received signal used for timing acquisition and tracking according to the present invention.

FIG. 4 shows a timing diagram for a received signal used for timing acquisition and tracking according to the present invention. At the receiver, each transmitted impulse I within an acquisition frame 20 becomes an impulse response for the channel, contaminated by noise and interference. Channel dispersion causes the transmitted impulse to spread to an effective time span of up to P+1 samples. Thus, the received signal during an acquisition frame is defined to be the same number of contaminated channel impulse responses as transmitted impulses, with each channel impulse being followed by P+1 samples of an essentially zero signal. During data frame 21 of the received signal, the overall signal at any instant is the superposition of P+1 individual signals originating from P+1 transmitted data samples.

To establish a frame (symbol) boundary, or equivalently, an effective boundary of a received signal due to a transmitted discrete impulse, a summation window having a time length of P+1 received samples is used for calculating a sum of the squares of the samples contained in the window. The summation window is advanced through the received timing acquisition frame by one sample at a time so that a maximum sum can be determined and identified. The specific P+1 samples giving rise to a maximum sum are taken as the channel impulse response and is used for coherent data detection.

Fine tuning steps can be performed for improving both timing acquisition and tracking. For example, multiple summation windows can be used for determining a maximum sum, the sampling rate can be increased during the timing acquisition and tracking frames, and a dedicated pilot tone can be used within each data frame for correcting clock drift. The timing estimation accuracy can be improved when the summation is performed using multiple summation windows that are spaced in time at P+1 samples. Additionally, a higher sampling rate than $1/T_s$ may be used at the receiver during the timing acquisition and tracking frames for fine tuning the channel impulse response estimate.

The timing acquisition procedure of the present invention described above achieves initial timing acquisition. The same technique can be applied for accomplishing timing tracking during data transmission if, after every predetermined number of data frames (symbols), a shortened synchronization frame (represented by 20 in FIGS. 2 and 4) having a predetermined number of discrete impulses I is inserted into the transmission signal. As with the acquisition frame, each discrete impulse I of a timing frame is spaced in time from each other by $2(P+1)T_s$. Additionally, the first discrete impulse is spaced in time from the last data sample in the preceding data frame by the same amount. Similarly, the last discrete impulse is spaced in time by $2(P+1)T_s$ from the first prefix sample of the next data frame. Timing tracking is done by identifying a maximum sum associated with a summation window that is advanced in time through the received synchronization frame one sample at a time. As before, multiple summation windows and/or an increased sampling frequency during the synchronization frame can be used. The received samples in a summation window forming a maximum sum are an updated channel impulse response that can be used for detecting data symbols between a synchronization frame and the next synchronization frame. Timing correction can be further introduced for each data symbol if the data symbol frame contains a dedicated pilot tone. The number of discrete impulses used in a synchronization frame can be fewer than the number used during a timing acquisition frame because the initial timing has been established.

While the present invention has been described in connection with the illustrated embodiments, it will be appreciated and understood that modifications may be made without departing from the true spirit and scope of the invention.

What is claimed is:

1. A method for generating a signal for acquiring data frame timing in a discrete multitone modem system, the method comprising the steps of:

generating an acquisition frame, the acquisition frame having a first predetermined number of impulse signals, each impulse signal being spaced in time by $2(P+1)T_s$, such that $1/T_s$ is a sample transmission rate, and P is a time length in samples of a cyclic prefix that is added to a data frame; and generating at least one data frame subsequent to the acquisition frame, each data frame having its own cyclic prefix and at least as many data samples as samples of the cyclic prefix of the data frame.

2. The method according to claim 1, further comprising the step of transmitting the acquisition frame and the at least one data frame.

3. The method according to claim 1, wherein the cyclic prefix length P is chosen such that a channel impulse response seen at a receiver effectively spans no more than P+1 samples when a signal received at the receiver is sampled at the $1/T_s$ rate.

4. The method according to claim 1, wherein the impulse signals are discrete delta signals, the method further comprising the step of digital-to-analog converting the acquisition frame and the at least one data frame to an analog signal.

5. The method according to claim 2, further comprising the steps of:

receiving the acquisition frame;

sampling the received acquisition frame;

advancing a summation window through the received acquisition frame;

summing the sampled acquisition frame over each summation window, each summation window spanning P+1 samples of the acquisition frame; and determining a summation window corresponding to a maximum sum.

6. The method according to claim 5, wherein the step of advancing the summation window advances the summation window one sample at a time.

7. The method according to claim 5, wherein the received acquisition frame is sampled at a rate of $1/T_s$.

8. The method according to claim 5, wherein the received acquisition frame is sampled at a rate greater than $1/T_s$.

9. The method according to claim 5, wherein the step of advancing the summation window through the received acquisition frame includes the step of advancing a plurality of summation windows through the received acquisition frame, wherein the step of summing the sampled acquisition frame over each summation window includes the step of summing the sampled acquisition frame over each of the plurality of summation windows, and wherein the step of determining the summation window corresponding to the maximum sum includes the step of determining a plurality of summation windows corresponding to a maximum sum over the plurality of summation windows.

10. The method according to claim 5, further comprising the step of determining a data frame boundary based on the summation window corresponding to the maximum sum.

11. The method according to claim 10, further comprising the steps of:

estimating a channel impulse response based on a portion of the received acquisition frame corresponding to the maximum-sum summation window; and coherently detecting data based on the estimated channel impulse response.

12. The method according to claim 1, further comprising the steps of generating a synchronization frame after every predetermined number of data frames, the synchronization frame having a second predetermined number of impulse signals, each impulse signal of the synchronization frame being spaced in time from each other by $2(P+1)T_s$, a first impulse signal of each synchronization frame being spaced in time by $2(P+1)T_s$ from a last data sample in a data frame immediately preceding the synchronization frame, and a last impulse signal of each synchronization frame being spaced in time by $2(P+1)T_s$ from a first prefix sample of a data frame immediately subsequent to the synchronization frame; and transmitting the synchronization frame.

13. The method according to claim 12, further comprising the steps of receiving the synchronization frame;

sampling the received synchronization frame;

advancing a summation window through the received synchronization frame;

summing the sampled synchronization frame over each summation window, each summation window spanning P+1 samples of the synchronization frame; and determining a summation window for the synchronization frame corresponding to a maximum sum.

14. The method according to claim 13, wherein the step of advancing the summation window advances the summation window one sample at a time.

15. The method according to claim 13, further comprising the step of tracking a previously determined data frame boundary based on the summation window for the synchronization frame corresponding to the maximum sum.

16. The method according to claim 15, further comprising the steps of:

updating an estimated channel impulse response based on a portion of the received synchronization frame corresponding to the maximum-sum summation window for the synchronization frame; and coherently detecting data based on the updated channel impulse response.

17. A system for generating a signal for acquiring data frame timing in a discrete multitone modem system, the system for generating the signal comprising:

a multitone data frame generator outputting at least one multitone data frame, each data frame including a cyclic prefix having at least one sample and at least as many data samples as samples of the cyclic prefix of the data frame;

a discrete impulse generator outputting a discrete impulse signal having a first predetermined number of impulses, each impulse being spaced in time by $2(P+1)T_s$, where $1/T_s$ is a sample transmission rate, and P is a time length in samples of the cyclic prefix of a multitone data frame; and a multiplexor coupled to the multitone data frame generator and the discrete impulse generator, the multiplexor selectively outputting an acquisition frame signal and a data frame signal subsequent to the acquisition frame signal, the acquisition frame signal including the discrete impulse signal and the data frame signal including the at least one multitone data frame.

18. The system according to claim 17, further comprising a transmitter transmitting the acquisition frame signal and the data frame signal.

19. The system according to claim 18, wherein the cyclic prefix length P is chosen such that a channel impulse response seen at a receiver effectively spans no more than P+1 samples when a signal received at the receiver is sampled at the $1/T_s$ rate.

20. The system according to claim 17, wherein each discrete impulse output by the discrete impulse generator is a discrete delta signal.

21. The system according to claim 17, further comprising a digital-to-analog converter converting the output of the multiplexor to an analog signal.

22. The system according to claim 17, wherein the multiplexor further outputs a synchronization frame after every predetermined number of data frames, the synchronization frame having a second predetermined number of impulses generated by the discrete impulse generator, each impulse signal of the synchronization frame being spaced in time from each other by $2(P+1)T_s$, a first impulse signal of each synchronization frame being spaced in time by $2(P+1)T_s$ from a last data sample in a data frame immediately preceding the synchronization frame, and a last impulse signal of each synchronization frame being spaced in time by $2(P+1)T_s$ from a first prefix sample of a data frame immediately subsequent to the synchronization frame.

23. A method of acquiring data frame timing in a discrete multitone modem system, the method comprising the steps of:

receiving a signal having an acquisition frame and at least one data frame, the acquisition frame having a first predetermined number of impulse signals, each impulse signal being spaced in time by $2(P+1)T_s$, such that $1/T_s$ is a sample transmission rate, and P is a time length in samples of a cyclic prefix that is added to at least one data frame, the at least one data frame being subsequent to the acquisition frame, each data frame having its own cyclic prefix and at least as many data samples as samples of the cyclic prefix of the data frame;

sampling the received acquisition frame;

advancing a summation window through the received acquisition frame;

summing the sampled acquisition frame over each summation window, each summation window spanning P+1 samples of the acquisition frame; and determining a summation window corresponding to a maximum sum.

24. The method according to claim 23, wherein the step of advancing the summation window advances the summation window one sample at a time.

25. The method according to claim 23, wherein the received acquisition frame is sampled at a rate of $1/T_s$.

26. The method according to claim 23, wherein the received acquisition frame is sampled at a rate greater than $1/T_s$.

27. The method according to claim 23, wherein the step of advancing the summation window through the received acquisition frame includes the step of advancing a plurality of summation windows through the received acquisition frame, wherein the step of summing the sampled acquisition frame over each summation window includes the step of summing the sampled acquisition frame over each of the plurality of summation windows, and wherein the step of determining the summation window corresponding to the maximum sum includes the step of determining a plurality of summation windows corresponding to a maximum sum over the plurality of summation windows.

28. The method according to claim 23, further comprising the step of determining a data frame boundary based on the summation window corresponding to the maximum sum.

29. The method according to claim 28, further comprising the steps of:

estimating a channel impulse response based on a portion of the received acquisition frame corresponding to the maximum-sum summation window; and coherently detecting data based on the estimated channel impulse response.

30. The method according to claim 23, further comprising the steps of receiving a synchronization frame after every predetermined number of data frames, the synchronization frame having a second predetermined number of impulse signals, each impulse signal of the synchronization frame being spaced in time from each other by $2(P+1)T_s$, a first impulse signal of each synchronization frame being spaced in time by $2(P+1)T_s$ from a last data sample in a data frame immediately preceding the synchronization frame, and a last impulse signal of each synchronization frame being spaced in time by $2(P+1)T_s$ from a first prefix sample of a data frame immediately subsequent to the synchronization frame;

sampling the received synchronization frame;

advancing a summation window through the received synchronization frame;

summing the sampled synchronization frame over each summation window, each summation window spanning P+1 samples of the synchronization frame; and determining a summation window for the synchronization frame corresponding to a maximum sum.

31. The method according to claim 30, wherein the step of advancing the summation window advances the summation window one sample at a time.

32. The method according to claim 30, further comprising the step of tracking a previously determined data frame boundary based on the summation window for the synchronization frame corresponding to the maximum sum.

33. The method according to claim 32, further comprising the steps of:

updating an estimated channel impulse response based on a portion of the received synchronization frame corresponding to the maximum-sum summation window for the synchronization frame; and coherently detecting data based on the updated channel impulse response.

34. The method according to claim 30, wherein the received synchronization frame is sampled at a rate of $1/T_s$.

35. The method according to claim 30, wherein the received synchronization frame is sampled at a rate greater than $1/T_s$.

36. The method according to claim 30, wherein the step of advancing the summation window through the received synchronization frame includes the step of advancing a plurality of summation windows through the received synchronization frame, wherein the step of summing the sampled synchronization frame over each summation window includes the step of summing the sampled synchronization frame over each of the plurality of summation windows, and wherein the step of determining the maximum summation window for the synchronization frame corresponding to the maximum sum includes the step of determining a plurality of summation windows for the synchronization frame corresponding to a maximum sum over the plurality of summation windows.

37. A system for acquiring data frame timing in a discrete multitone modem system, the system for acquiring data frame timing comprising:

a receiver receiving a signal having an acquisition frame and at least one data frame, the acquisition frame having a first predetermined number of impulse signals, each impulse signal being spaced in time by $2(P+1)T_s$, such that $1/T_s$ is a sample transmission rate, and P is a time length in samples of a cyclic prefix that is added to at least one data frame, the at least one data frame being subsequent to the acquisition frame, each data frame having its own cyclic prefix and at least as many data samples as samples of the cyclic prefix of the data frame;

a sampling circuit sampling the received acquisition frame; and a summation circuit operating on the sampled received acquisition frame, the sampling circuit advancing a summation window through the received acquisition frame and summing the sampled acquisition frame over each summation window, each summation window spanning P+1 samples of the acquisition frame, the summation circuit determining a summation window corresponding to a maximum sum.

38. The system according to claim 37, wherein the summation circuit advances the summation window one sample at a time.

39. The system according to claim 37, wherein the cyclic prefix length P is chosen such that a channel impulse response seen at a receiver effectively spans no more than P+1 samples when a signal received at the receiver is sampled at the $1/T_s$ rate.

40. The system according to claim 37, further comprising a processor coupled to the summation circuit, the processor determining a data frame boundary based on the summation window corresponding to the maximum sum.

41. The system according to claim 40, wherein the processor estimates a channel impulse response based on a portion of the received acquisition frame corresponding to the maximum-sum summation window, the system further comprising a detector coherently detecting data based on the estimated channel impulse response.

42. The system according to claim 37, wherein the sampling circuit samples the received acquisition frame at a rate of $1/T_s$.

43. The system according to claim 37, wherein the sampling circuit samples the received acquisition frame at a rate greater than $1/T_s$.

44. The system according to claim 37, wherein the summation circuit advances a plurality of summation windows through the received acquisition frame, sums the sampled acquisition frame over each of the plurality of summation windows, and determines a plurality of summation windows corresponding to a maximum sum over the plurality of summation windows.

45. The system according to claim 37, wherein the receiver receives a synchronization frame after every predetermined number of data frames, the synchronization frame having a second predetermined number of impulse signals, each impulse signal of the synchronization frame being spaced in time from each other by $2(P+1)T_s$, a first impulse signal of each synchronization frame being spaced in time by $2(P+1)T_s$ from a last data sample in a data frame immediately preceding the synchronization frame, and a last impulse signal of each synchronization frame being spaced in time by $2(P+1)T_s$ from a first prefix sample of a data frame immediately subsequent to the synchronization frame, wherein the sampling circuit samples the received synchronization frame, wherein the summation circuit advances a summation window through the received synchronization frame, sums the sampled synchronization frame over each summation window, each summation window spanning P+1 samples of the synchronization frame, and determines a summation window for the synchronization frame corresponding to a maximum sum.

46. The system according to claim 45, wherein the summation circuit advances the summation window one sample at a time.

47. The system according to claim 45, further comprising a processor coupled to the summation circuit, the processor tracking a previously determined data frame boundary based on the summation window for the synchronization frame corresponding to the maximum sum.

48. The system according to claim 47, wherein the processor updates an estimated channel impulse response based on a portion of the received synchronization frame corresponding to the maximum-sum summation window for the synchronization frame, the system further comprising a detector coherently detecting data based on the updated channel impulse response.

49. The system according to claim 45, wherein the sampling circuit samples the received synchronization frame at a rate of $1/T_s$.

50. The system according to claim 45, wherein the sampling circuit samples the received synchronization frame at a rate greater than $1/T_s$.

51. The system according to claim 45, wherein the summation circuit advances a plurality of summation windows through the received synchronization frame, sums the sampled synchronization frame over each of the plurality of summation windows, and determines a plurality of summation windows corresponding to a maximum sum over the plurality of summation windows.

52. A method for acquiring data frame timing in a discrete multitone modem system, the method comprising the steps of:

generating an acquisition frame, the acquisition frame having a first predetermined number of impulse signals, each impulse signal being spaced in time by $2(P+1)T_s$, such that $1/T_s$ is a sample transmission rate, and P is a time length in samples of a cyclic prefix that is added to a data frame;

generating at least one data frame subsequent to the acquisition frame, each data frame having its own cyclic prefix and at least as many data samples as samples of the cyclic prefix of the data frame;

transmitting the acquisition frame and the at least one data frame;

receiving the acquisition frame and the at least one data frame;

sampling the received acquisition frame;

advancing a summation window through the received acquisition frame;

summing the sampled acquisition frame over each summation window, each summation window spanning P+1 samples of the acquisition frame; and determining a summation window corresponding to a maximum sum.

53. The method according to claim 52, wherein the step of advancing the summation window advances the summation window one sample at a time.

54. The method according to claim 52, wherein the cyclic prefix length P is chosen such that a channel impulse response seen at a receiver effectively spans no more than P+1 samples when a signal received at the receiver is sampled at the $1/T_s$ rate.

55. The method according to claim 52, wherein the impulse signals are discrete delta signals, the method further comprising the step of analog-to-digital converting the acquisition frame and the at least one data frame to an analog signal.

56. The method according to claim 52, wherein the received acquisition frame is sampled at a rate of $1/T_s$.

57. The method according to claim 52, wherein the received acquisition frame is sampled at a rate greater than $1/T_s$.

58. The method according to claim 52, wherein the step of advancing the summation window through the received acquisition frame includes the step of advancing a plurality of summation windows through the received acquisition frame, wherein the step of summing the sampled acquisition frame over each summation window includes the step of summing the sampled acquisition frame over each of the plurality of summation windows, and wherein the step of determining the summation window corresponding to the maximum sum includes the step of determining a plurality of summation windows corresponding to a maximum sum over the plurality of summation windows.

59. The method according to claim 52, further comprising the step of determining a data frame boundary based on the summation window corresponding to the maximum sum.

60. The method according to claim 59, further comprising the steps of:

estimating a channel impulse response based on a portion of the received acquisition frame corresponding to the maximum-sum summation window; and coherently detecting data based on the estimated channel impulse response.

61. The method according to claim 52, further comprising the steps of:

generating a synchronization frame after every predetermined number of data frames, the synchronization frame having a second predetermined number of impulse signals, each impulse signal of the synchronization frame being spaced in time from each other by $2(P+1)T_s$, a first impulse signal of each synchronization frame being spaced in time by $2(P+1)T_s$ from a last data sample in a data frame immediately preceding the synchronization frame, and a last impulse signal of each synchronization frame being spaced in time by $2(P+1)T_s$ from a first prefix sample of a data frame immediately subsequent to the synchronization frame;

receiving the synchronization frame;

sampling the received synchronization frame;

advancing a summation window through the received synchronization frame;

summing the sampled synchronization frame over each summation window, each summation window spanning P+1 samples of the synchronization frame; and determining a summation window for the synchronization frame corresponding to a maximum sum.

62. The method according to claim 61, wherein the step of advancing the summation window advances the summation window one step at a time.

63. The method according to claim 62, further comprising the steps of:

tracking a previously determined data frame boundary based on the summation window for the synchronization frame corresponding to the maximum sum;

updating an estimated channel impulse response based on a portion of the received synchronization frame corresponding to the maximum-sum summation window for the synchronization frame; and coherently detecting data based on the updated channel impulse response.

64. The method according to claim 61, wherein the received synchronization frame is sampled at a rate of $1/T_s$.

65. The method according to claim 61, wherein the received synchronization frame is sampled at a rate greater than $1/T_s$.

66. The method according to claim 61, wherein the step of advancing the summation window through the received synchronization frame includes the step of advancing a plurality of summation windows through the received synchronization frame, wherein the step of summing the sampled synchronization frame over each summation window includes the step of summing the sampled synchronization frame over each of the plurality of summation windows, and wherein the step of determining the summation window for the synchronization frame corresponding to the maximum sum includes the step of determining a plurality of summation windows corresponding to a maximum sum over the plurality of the summation windows.

67. A system for acquiring data frame timing in a discrete multitone modem system, the system for acquiring data frame timing comprising:

a transmitter including, a multitone data frame generator outputting at least one multitone data frame, each data frame including a cyclic prefix having at least one sample and at least as many data samples as samples of the cyclic prefix of the data frame, a discrete impulse generator outputting a discrete impulse signal having a predetermined number of impulses, each impulse being spaced in time by $2(P+1)T_s$, where $1/T_s$ is a sample transmission rate, and P is a time length in samples of the cyclic prefix of a multitone data frame, and a multiplexor coupled to the multitone data frame generator and the discrete impulse generator, the multiplexor selectively outputting an acquisition frame signal and a data frame signal subsequent to the acquisition frame signal, the acquisition frame signal including the discrete impulse signal and the data frame signal including the at least one data frame, and a transmitter transmitting the acquisition frame signal and the data frame signal; and a receiver including, a receiver receiving the acquisition frame signal and the data frame signal, a sampling circuit sampling the received acquisition frame signal, and a summation circuit operating on the sampled received acquisition frame signal, the sampling circuit advancing a summation window through the received acquisition frame and summing the sampled acquisition frame over each summation window, each summation window spanning P+1 samples of the acquisition frame, the summation circuit determining a summation window corresponding to a maximum sum.

68. The system according to claim 67, wherein the summation circuit advances the summation window one sample at a time.

69. The system according to claim 67, wherein the cyclic prefix length P is chosen such that a channel impulse response seen at a receiver effectively spans no more than P+1 samples when a signal received at the receiver is sampled at the $1/T_s$ rate.

70. The system according to claim 67, wherein each impulse output by the discrete impulse generator is a discrete delta signal.

71. The system according to claim 67, further comprising a digital-to-analog converter circuit converting the multiplexor output to an analog signal.

72. The system according to claim 67, wherein the multiplexor further outputs a synchronization frame after every predetermined number of data frames, the synchronization frame having a second predetermined number of impulses generated by the discrete impulse generator, each impulse signal of the synchronization frame being spaced in time from each other by $2(P+1)T_s$, a first impulse signal of each synchronization frame being spaced in time by $2(P+1)T_s$ from a last data sample in a data frame immediately preceding the synchronization frame, and a last impulse signal of each synchronization frame being spaced in time by $2(P+1)T_s$ from a first prefix sample of a data frame immediately subsequent to the synchronization frame.

73. The system according to claim 67, wherein the sampling circuit samples the received acquisition frame at a rate of $1/T_s$.

74. The system according to claim 67, wherein the sampling circuit samples the received acquisition frame at a rate greater than $1/T_s$.

75. The system according to claim 67, further comprising a processor, coupled to the summation circuit, the processor determining a data frame boundary based on the summation window corresponding to the maximum sum.

76. The system according to claim 75, wherein the processor estimates a channel impulse response based on a portion of the received acquisition frame corresponding to the maximum-sum summation window, the system further comprising a detector coherently detecting data based on the estimated channel impulse response.

77. The system according to claim 67, wherein the summation circuit advances a plurality of summation windows through the received acquisition frame, sums the sampled acquisition frame over each of the plurality of summation windows, and determines a plurality of summation windows corresponding to a maximum sum over the plurality of summation windows.

78. The system according to claim 67, wherein the receiver receives a synchronization frame after every predetermined number of data frames, the synchronization frame having a second predetermined number of impulse signals, each impulse signal of the synchronization frame being spaced in time from each other by $2(P+1)T_s$, a first impulse signal of each synchronization frame being spaced in time by $2(P+1)T_s$ from a last data sample in a data frame immediately preceding the synchronization frame, and a last impulse signal of each synchronization frame being spaced in time by $2(P+1)T_s$ from a first prefix sample of a data frame immediately subsequent to the synchronization frame, wherein the sampling circuit samples the received synchronization frame, wherein the summation circuit advances a summation window through the received synchronization frame, sums the sampled synchronization frame over each summation window, each summation window spanning P+1 samples of the synchronization frame, and determines a summation window for the synchronization frame corresponding to a maximum sum.

79. The system according to claim 78, wherein the summation circuit advances the summation window one sample at a time.

80. The system according to claim 78, further comprising a processor coupled to the summation circuit, the processor tracking a previously determined data frame boundary based on the summation window for the synchronization frame corresponding to the maximum sum.

81. The system according to claim 80, wherein the processor updates an estimated channel impulse response based on a portion of the received synchronization frame corresponding to the maximum-sum summation window for the synchronization frame, the system further comprising a detector coherently detecting data based on the updated channel impulse response.

82. The system according to claim 78, wherein the sampling circuit samples the received synchronization frame at a rate of $1/T_s$.

83. The system according to claim 78, wherein the sampling circuit samples the received synchronization frame at a rate greater than $1/T_s$.

84. The system according to claim 78, wherein the summation circuit advances a plurality of summation windows through the received synchronization frame, sums the sampled synchronization frame over each of the plurality of summation windows, and determines a plurality of summation windows corresponding to a maximum sum over the plurality of summation windows.

* * * * *